United States Patent
Alavi et al.

(10) Patent No.: US 12,137,009 B2
(45) Date of Patent: Nov. 5, 2024

(54) DETERMINING SIMILARITY BETWEEN CHANNEL ESTIMATIONS

(71) Applicant: Telefonaktiebolaget LM Ericsson (publ), Stockholm (SE)

(72) Inventors: Faezeh Alavi, Gothenburg (SE); Jöran Roslund, Gothenburg (SE); Gunilla Sjöström, Gothenburg (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 4 days.

(21) Appl. No.: 18/248,569

(22) PCT Filed: Oct. 15, 2020

(86) PCT No.: PCT/EP2020/079056
§ 371 (c)(1),
(2) Date: Apr. 11, 2023

(87) PCT Pub. No.: WO2022/078606
PCT Pub. Date: Apr. 21, 2022

(65) Prior Publication Data
US 2023/0412426 A1    Dec. 21, 2023

(51) Int. Cl.
*H04L 25/02*    (2006.01)
*H04L 5/00*    (2006.01)

(52) U.S. Cl.
CPC ........ *H04L 25/0202* (2013.01); *H04L 5/0048* (2013.01)

(58) Field of Classification Search
CPC ............. H04L 25/0202; H04L 25/0226; H04L 5/0048; H04L 5/0051
See application file for complete search history.

(56) References Cited

U.S. PATENT DOCUMENTS

| 7,953,176 B2 | 5/2011 | Roh |
| 9,071,473 B2 | 6/2015 | Yepez et al. |

(Continued)

FOREIGN PATENT DOCUMENTS

| WO | 2014168574 A1 | 10/2014 |
| WO | 2019129955 A1 | 7/2019 |

OTHER PUBLICATIONS

International Search Report and Written Opinion dated Jul. 1, 2021 for International Application No. PCT/EP2020/079056 filed Oct. 15, 2020; consisting of 9 pages.

(Continued)

*Primary Examiner* — David S Huang
(74) *Attorney, Agent, or Firm* — Weisberg I.P. Law, P.A.

(57) ABSTRACT

The present disclosure relates to a control unit that is adapted to provide a plurality of channel estimates which are separated in time during a certain first time period and to represent each channel estimate by a corresponding complex channel vector in a complex vector space. Each channel estimate constitutes an estimated channel for a radio channel provided between at least two wireless communication nodes, where the radio channel constitutes a medium via which signals transmitted between nodes are transferred. The control unit is further adapted to calculate a difference angle between two of the complex channel vectors which are separated in time during a certain second time period, forming a pair of complex channel vectors, where the difference angle is a Kähler angle ($\theta_K$).

20 Claims, 5 Drawing Sheets

(56) References Cited

U.S. PATENT DOCUMENTS

| | | |
|---|---|---|
| 11,159,349 B2 | 10/2021 | Apelfrodj et al. |
| 2015/0155993 A1* | 6/2015 | Berggren .............. H04L 5/0023 370/330 |
| 2017/0311188 A1 | 10/2017 | Sun et al. |
| 2019/0074939 A1 | 3/2019 | Fitch et al. |
| 2020/0304253 A1* | 9/2020 | Choi ...................... H04B 17/24 |
| 2023/0047000 A1* | 2/2023 | Guo ...................... H04L 5/0037 |

OTHER PUBLICATIONS

K. Scharnhorst; Angles in Complex Vector Spaces; math.HO; Sep. 14, 1999; consisting of 12 pages.

V.G. Reju, et al.; Undetermined Convolutive Blind Source Separation via Time-Frequency Masking; IEEE Transactions on Audio Speech and Language Processing; Source: IEEE Xplore; Feb. 2010; consisting of 17 pages.

3GPP TS 38.211 V15.4.0; 3rd Generation Partnership Project; Technical Specification Group Radio Access Network; NR; Physical channels and modulation (Release 15); Dec. 2018; consisting of 96 pages.

\* cited by examiner

DETERMINING SIMILARITY BETWEEN CHANNEL ESTIMATIONS

CROSS-REFERENCE TO RELATED APPLICATION

This application is a Submission Under 35 U.S.C. § 371 for U.S. National Stage Patent Application of International Application Number: PCT/EP2020/079056, filed Oct. 15, 2020 entitled "DETERMINING SIMILARITY BETWEEN CHANNEL ESTIMATIONS," the entirety of which is incorporated herein by reference.

TECHNICAL FIELD

The present disclosure relates to determining similarity between channel estimations, for example in order to optimize a present reference signal configuration.

BACKGROUND

Employing a reference signal (RS) is a fundamental technique in wireless networks, where an RS is sent as a predefined sequence of bits to support different main functions. In 4G networks, there are cell-specific reference signals which always are enabled, while in the 5G networks reference signals are user-specific and more configurable. In 5G technology, a demodulation reference signal (DMRS) is sent along with payload data for channel estimation purpose at the receiving device to aid it in demodulating the payload data. Since the properties of the radio channel can vary rapidly, such as moving user equipment (UE), the UE and/or a base station can be configured to employ the reference signals with higher density in the time-domain for a more recent channel estimation. For example, for 5G technology, up to four DMRSs can be used per time slot.

To support the scenarios with a fast changing channel, in 5G technology it is possible to configure more frequent reference signals for having more accurate channel estimation. However, reference signals add to the overhead and consequently reduce the number of available resource elements for user data allocation. Accordingly, it is better to reconfigure the RS configuration based on how fast the channel changes, otherwise, using the fixed RS configuration under all channel conditions, can result in reducing the peak rate. Hence, an adaptive reconfiguration is desirable to change the RS configuration based on the channel changes to achieve a peak rate.

US 2017311188 discloses a base station that can determine a Doppler metric associated with a wireless channel and UE where the Doppler metric is used to select one or both of a reference signal density and a channel estimation technique for the wireless channel and associated UE.

However, in US 2017311188 no Doppler metric is defined, and it is difficult to define a Doppler metric since the Doppler shift is difficult to estimate alone in the practical scenario as frequency deviation also can be due to frequency error in the transceiver. In addition, the Doppler spread in non-line of sight channels will also impact the Doppler shift, while this is not significant in the line-of-sight channels.

There are many other applications that can take advantage of an estimation of how and when a channel changes. For example, the statistics of how and when a channel changes can be used for cell planning. Knowledge of how and when a channel changes can furthermore be used when selecting a specific frequency band by comparing estimated channel properties in different frequency bands.

It is therefore desired to provide a means and a method for estimating how and when a channel changes where limited information regarding channel properties is used. The result can for example be used for optimizing a present reference signal configuration, but can also be applied to other applications.

SUMMARY

It is an object of the present disclosure to provide means and a method for estimating how and when a channel changes using only limited information regarding channel properties.

This object is obtained by means of a control unit that is adapted to provide a plurality of channel estimates which are separated in time during a certain first time period and to represent each channel estimate by a corresponding complex channel vector in a complex vector space. Each channel estimate constitutes an estimated channel for a radio channel provided between at least two wireless communication nodes. The radio channel constitutes a medium via which signals transmitted between nodes are transferred. The control unit is further adapted to calculate a difference angle between two of the complex channel vectors which are separated in time during a certain second time period, forming a pair of complex channel vectors, where the difference angle is a Kähler angle.

In this way, an estimation of how and when a channel has changed can be determined without any prior knowledge of its characteristics such as, e.g., line-of-sight or non-line-of-sight, only based on available channel estimations. For example, a fast-moving node such as a UE can be configured with suitable parameters without knowing or estimating its speed.

According to some aspects, the plurality of channel estimates comprises at least three channel estimates, where the control unit is adapted to calculate the Kähler angle between at least two different pairs of complex channel vectors corresponding to the at least three channel estimates such that a plurality of Kähler angles is determined and to determine a Kähler angle metric for each Kähler angle. The control unit is further adapted to determine an average of the Kähler angle metrics for the first time period, where the average of the Kähler angle metrics forms a total metric that indicates to which degree the estimated channel has changed during the first time period.

According to some aspects, the plurality of channel estimates comprises at least three channel estimates, and where the control unit is adapted to calculate the Kähler angle between at least two different pairs of complex channel vectors corresponding to the at least three channel estimates such that a plurality of Kähler angles is determined, and to determine an average Kähler angle for the first time period. The control unit is further adapted to determine a Kähler angle metric for the average Kähler angle, where the Kähler angle metric forms a total metric that indicates to which degree the estimated channel has changed during the first time period.

This means that the estimation of how and when a channel has changed can be determined in several secure and reliable ways.

According to some aspects, the Kähler angle metric is one of.
   the Kähler angle itself,
   sines for the Kähler angle, $\sin \theta_K$, or
   cosines for the Kähler angle, $\cos \theta_K$.

According to some aspects, the Kähler angle metric is a monotonic function of the Kähler angle.

This means that the Kähler angle metric can be chosen to suit its further implementation.

According to some aspects, the control unit is adapted to increase a reference signal density if the total metric indicates that the estimated channel has changed to a degree that exceeds a first threshold value, and to decrease a reference signal density if the total metric indicates that the estimated channel has changed to a degree that falls below a second threshold value. Otherwise, the control unit is adapted to maintain the present reference signal density, where the reference signal density relates to a density for reference signals exchanged between at least two of the wireless communication nodes.

In this way, a measurement for channel similarity can be used to reconfigure additional reference signals only when it is necessary, focusing on using obtained channel estimations corresponding to reference signals at different instances and assess whether they are similar or dissimilar. If they are determined to be similar to a certain extent, superfluous reference signals can be de-configured.

If they are not determined to be similar to a certain extent, extra reference signals can be configured at shorter time intervals.

According to some aspects, the control unit is comprised in one of the wireless communication nodes.

According to some aspects, the control unit is comprised in a remote server that is accessible for at least one of the wireless communication nodes.

This means that the estimation of how and when a channel has changed can be determined can be performed both centrally and locally, wherever suitable.

This object is also obtained by means of methods, wireless communication nodes and computer program product which are associated with the above advantages.

BRIEF DESCRIPTION OF THE DRAWINGS

The present disclosure will now be described more in detail with reference to the appended drawings, where.

DETAILED DESCRIPTION

Figure 1:
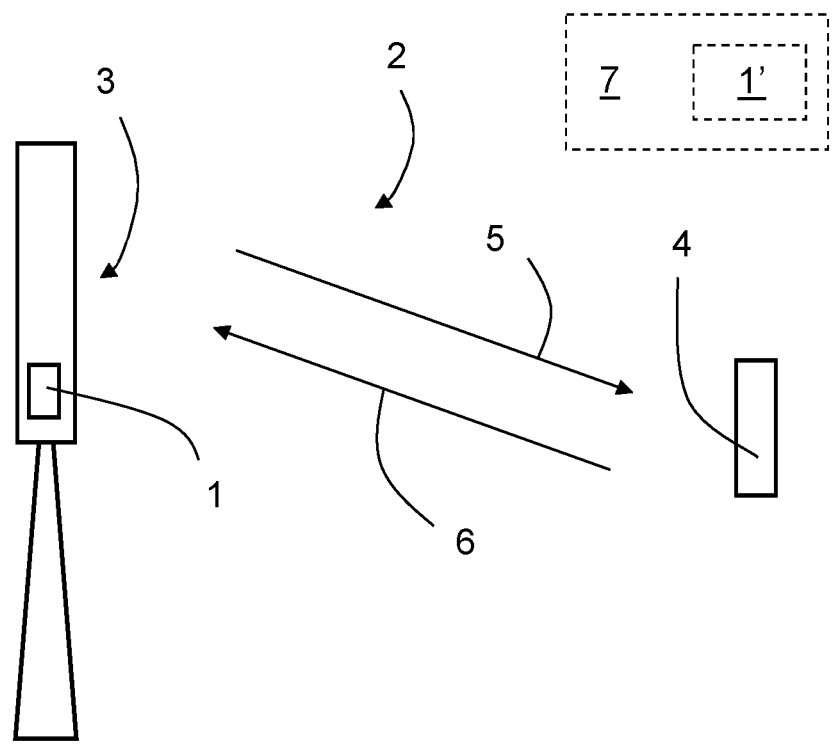
FIG. 1 schematically illustrates a first wireless communication node and a second wireless communication node with an intermediate channel.

Aspects of the present disclosure will now be described more fully hereinafter with reference to the accompanying drawings. The different devices, systems, computer programs and methods disclosed herein can, however, be realized in many different forms and should not be construed as being limited to the aspects set forth herein. Like numbers in the drawings refer to like elements throughout.

The terminology used herein is for describing aspects of the disclosure only and is not intended to limit the invention. As used herein, the singular forms "a", "an" and "the" are intended to include the plural forms as well, unless the context clearly indicates otherwise.

With reference to FIG. 1, there is a base station (BS) 3 and a User Equipment (UE) 4 that can be any type of suitable user terminal. The BS 3 and the UE 4 are generally constituted by wireless communication nodes 3, 4 and communicate wirelessly via a radio channel 2. In order to support the communication, using reference signals (RS) 5, 6 are sent as a predefined sequence of bits to support different main functions and can for example be in the form of cell-specific reference signals which are always enabled and user-specific reference signals that are more configurable.

In all communication, signals transmitted between nodes 3, 4 go through a medium, the radio channel 2, where the signals get distorted. To properly decode received signals, it is often necessary to know the characteristics of the channel 2. The process of quantifying the characteristics is generally referred to as channel estimation. In this, a parameterized mathematical model is used to correlate a transmitted signal and a received signal. By transmitting a known signal, usually in the form of one or more reference signals, and analyzing the subsequently received signal, it is possible to obtain estimates of the parameters of the model, these estimates constituting channel estimates. To account for effects such as attenuation and phase shifting for different frequencies, channel estimates are commonly expressed as arrays of complex numbers.

For a channel that is changing in time, channel estimates obtained at one instant are likely to be different from the ones obtained at a later instant.

This means that the properties of the channel 2 can vary rapidly, for example due to a moving UE, a moving obstacle or heavy rain. In such a case, the UE 4 can be configured to employ the reference signals with higher density in the time-domain for a more recent channel estimation.

Since reference signals require system resources, and at the same time are needed to increase the transmission rate, it is desired to configure reference signals to have a sufficient but not superfluous density.

By obtaining channel estimations at different instances, and assess whether they are similar or dissimilar the reference signal density can be changed accordingly. If the channel estimations are similar, superfluous reference signals can be de-configured, decreasing reference signal density, and if the channel estimations are not similar, additional reference signals can be configured at shorter time intervals, increasing reference signal density.

Figure 2A:
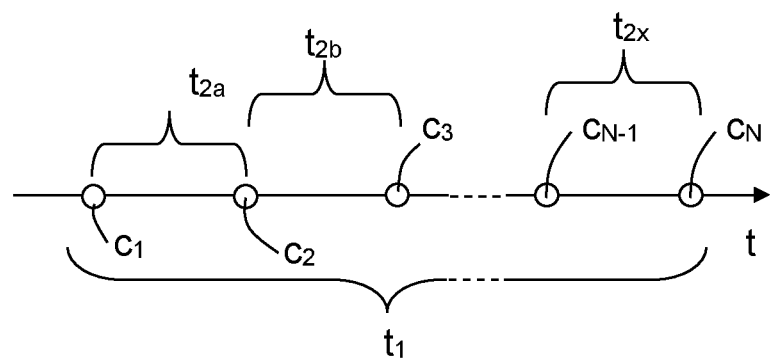
FIG. 2A schematically illustrates a first example of channel estimates provided during a timeline.

With reference also to FIG. 2A that illustrates channel estimates provided during a timeline, the BS 3 comprises a control unit 1 that is adapted to provide a plurality of channel estimates $c_1$, $c_2$, $c_3$; $c_{N-1}$, $c_N$, which are separated in time during a certain first time period $t_1$, and to represent each channel estimate by a corresponding complex channel vector in a complex vector space. Each channel estimate $c_1$, $c_2$, $c_3$; $c_{N-1}$, $c_N$ constitutes an estimated channel for the radio channel 2. The aim is to estimate the channel coefficient, and this can be done using different types of channel estimators such as for example minimum mean square error (MMSE) channel estimation.

The control unit 1 is further adapted to calculate a difference angle between two of the complex channel vectors, forming a first pair of complex channel vectors. In this example, these complex channel vectors correspond to a first channel estimate $c_1$ and a second channel estimate $c_2$, where the channel estimates $c_1$, $c_2$ are separated in time during a certain second time period $t_{2a}$, forming a first pair of channel estimates $c_1$, $c_2$ that corresponds to the first pair of complex channel vectors, where the difference angle is a Kähler angle $\theta_K$.

The Kähler angle is previously known and is for example discussed in the paper K. Scharnhorst, Angles in Complex Vector Space, Acta Applicandae Mathematicae, 2001. The Kähler angle is also known under other designations such as for example the Kähler function, Kähler form, characteristic deviation, holomorphy angle and Wirtinger angle.

Figure 2B:
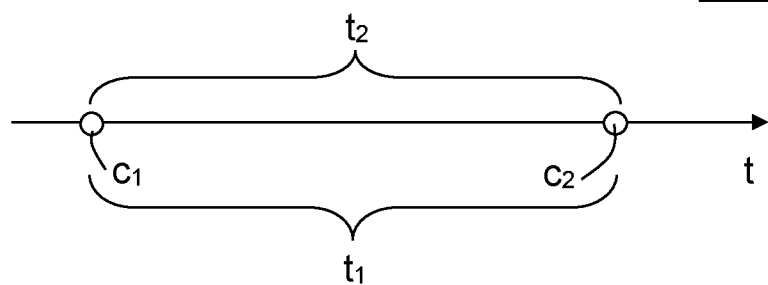
FIG. 2B schematically illustrates a second example of channel estimates provided during a timeline.

Generally, the second time period $t_{2a}$, $t_{2b}$, $t_{2x}$ relates to a time between two channel estimates $c_1$, $c_2$; $c_2$, $c_3$; $c_{N-1}$, $c_N$ and two corresponding complex channel vectors. FIG. 2B illustrates a case where the first time period $t_1$ is equal to the second time period $t_2$, where the two channel estimates $c_1$, $c_2$ of the second time period $t_2$ are the only channel estimates present in the first time period $t_1$ and results in providing only two complex channel vectors and one Kähler angle.

According to some aspects, and as illustrated in FIG. 2A, there is a plurality of second time periods $t_{2a}$, $t_{2b}$, $t_{2x}$ which are not equal to the first time period $t_1$. There is furthermore a plurality of pairs of channel estimates $c_1$, $c_2$; $c_2$, $c_3$; $c_{N-1}$, $c_N$ that correspond to a plurality of pairs of complex channel vectors where a plurality of Kähler angles are calculated, one for each pair of complex channel vectors. According to some aspects, an average is then formed for the Kähler angle $\theta_K$ or for any suitable Kähler angle metric $\theta_{KM}$.

A Kähler angle metric $\theta_{KM}$ can be regarded as a similarity coefficient and is associated with the Kähler angle $\theta_K$. The Kähler angle metric $\theta_{KM}$ can for example be constituted by the Kähler angle $\theta_K$ itself, sines for the Kähler angle $\theta_K$, sin $\theta_K$, which increases the more the estimated channel changes, or cosines for the Kähler angle $\theta_K$, cos $\theta_K$, which decreases the more the estimated channel changes. Any one of cos $\theta_K$ or sin $\theta_K$ can thus according to some aspects be used as a Kähler angle metric $\theta_{KM}$, and in principle, any monotonic function of the Kähler angle $\theta_K$, and of course the Kähler angle $\theta_K$ itself, can be used as a Kähler angle metric $\theta_{KM}$.

This means that the plurality of channel estimates comprises at least three channel estimates $c_1$, $c_2$; $c_2$, $c_3$; $c_{N-1}$, $c_N$, where the control unit 1, 1' is adapted to calculate the Kähler angle $\theta_K$ between at least two different pairs of corresponding complex channel vectors and to determine an average Kähler angle metric $\theta_{KM}$ for the first time period $t_1$. Then the second time periods $t_{2a}$, $t_{2b}$, $t_{2x}$ differ from the first time period $t_1$ since there are at least two different pairs of corresponding complex channel vectors provided by means of the channel estimates of the first time period.

Each pair of the channel estimates is provided during a second time period, where, as shown in FIG. 2A, a plurality of second time periods $t_{2a}$, $t_{2b}$, $t_{2x}$ are comprised in the first time period $t_1$.

Generally there is least one second time period with two channel estimates, enabling at least one Kähler angle $\theta_K$ to be calculated for the corresponding pair of complex channel vectors. In the case of a plurality of second time periods $t_{2a}$, $t_{2b}$, $t_{2x}$, these need not be of equal length, and can be regarded as a second type time period.

According to some aspects and as indicated above, if the Kähler angle $\theta_K$ itself is not the metric, a Kähler angle metric $\theta_{KM}$ is formed for each Kähler angle $\theta_K$ and then an average is formed for the Kähler angle metric θKM. The average of the Kähler angle metrics $\theta_{KM}$ forms a total metric $M_{Ta}$ that indicates to which degree the estimated channel has changed during the first time period $t_1$.

Alternatively, according to some further aspects, an average of the Kähler angles $\theta_K$, an average Kähler angle $\theta_{KA}$, may be calculated for a plurality of Kähler angles $\theta_K$, and if the Kähler angle $\theta_K$ itself is not the metric, a Kähler angle metric $\theta_{KM}$ is then formed for the average Kähler angle $\theta_{KA}$, the Kähler angle metric $\theta_{KM}$ constituting a total Kähler angle metric $M_{Tb}$ that indicates to which degree the estimated channel has changed during the first time period $t_1$.

If the Kähler angle itself is the metric, the average is calculated for the plurality of Kähler angles, and a Kähler angle metric $\theta_{KM}$ is then formed that equals the average Kähler angle $\theta_{KA}$, and no further metric is involved. The average Kähler angle $\theta_{KA}$ then forms the total metric $M_{Tb}$ that indicates to which degree the estimated channel has changed during the first time period $t_1$.

According to some aspects, the Kähler angle metric is one of:
the Kähler angle $\theta_K$ itself,
sines for the Kähler angle $\theta_K$, sin $\theta_K$, or
cosines for the Kähler angle $\theta_K$, cos $\theta_K$.

In the following, it is assumed that a metric is formed for each Kähler angle, and then an average is formed for the metrics.

Figure 3:
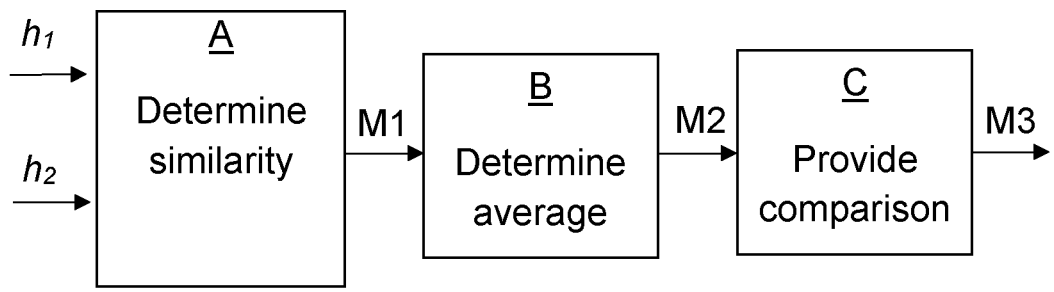
FIG. 3 shows a block diagram for calculation steps.

More in detail, with reference to the block diagram in FIG. 3, the control unit 1 is according to some aspects adapted to perform calculations in a number of steps A, B, C where the similarity between channel estimations at different times i denoted by $h_i$. The number of steps performed depends on what the determined result is intended to be used for. A first step A is always performed.

In the first step A, by considering a first complex vector $a=h_1$ as a channel estimation from a first reference signal and $b=h_2$ as a channel estimation from a second reference signal, the Kähler angle denoted by $\theta_K$, is calculated as follows:

First, the Hermitian product $$(a,b)_c = \Sigma_k \bar{a}_k b_k$$

is defined for any pair of complex vectors where $a_k$ and $b_k$ denote the components of the vectors and $\bar{a}_k$ is the complex conjugate of $a_k$. In the following, magnitude of the vectors is calculated as $$|a|=\sqrt{(a,a)_c} \text{ and } |b|=\sqrt{(b,b)_c}.$$

Second, a complex-valued angle, $\theta_c(a,b)$, is calculated as $$\cos \theta_c(a, b) = \frac{(a, b)_C}{|a||b|}.$$

Finally, the Kähler angle, $\theta_K$, $0 \leq \theta_K \leq \pi$, is obtained by:

$$\cos \theta_K(a, b) = \frac{\text{Im}\{\cos \theta_C(a, b)\}}{\sqrt{1 - (\text{Re}\{\cos \theta_C(a, b)\})^2}}.$$

After calculating the similarity, i.e., in the form of the Kähler angle metric $\theta_{KM}=\cos \theta_K(a, b)$, between first two channel estimations per specific time interval such that a similarity measure M1 is obtained, according to some aspects, a second step B is performed. At the second step B, the control unit 1 is adapted to perform averaging over several time intervals such that an averaged measure M2, corresponding to the total metric $M_{Ta}$ in the example above, is obtained for an average of a plurality Kähler angle metrics $\theta_{KM}$. According to some aspects, a third step C is performed. At the third step C, the control unit 1 is adapted to check the averaged measure M2 against a predetermined threshold such that a comparison measure M3 is provided, where the comparison measure M3 is forwarded for further use as will be discussed in the following.

According to some aspects, the comparison measure is used for determining if and to what extent, reference signal density should be re-configured, and is according to some aspects made between a Kähler angle metric $\theta_{KM}$, or an average of a plurality Kähler angle metrics $\theta_{KM}$, and one or more thresholds. Depending on which Kähler angle metric $\theta_{KM}$ that is used, the Kähler angle metric $\theta_{KM}$, or average of Kähler angle metrics $\theta_{KM}$, can either exceed a threshold or fall below a threshold when the estimated channel has been determined to change to such an extent that an action needs to be taken, for example an increase of reference signal density. When there is only one Kähler angle $\theta_K$, there is only one Kähler angle metric $\theta_{KM}$ that of course can be the Kähler angle $\theta_K$ itself.

Figure 4:
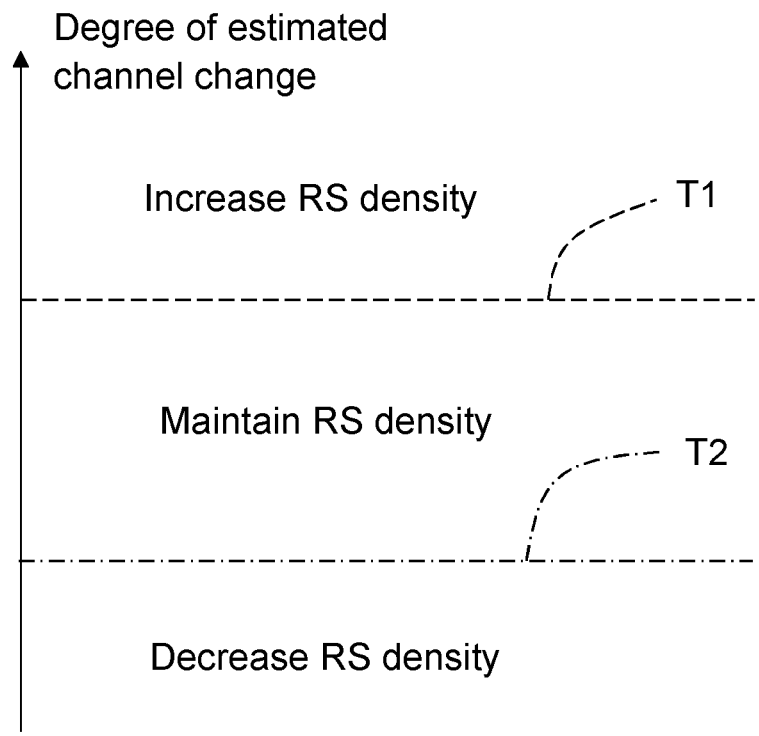
FIG. 4 schematically illustrates thresholds for a degree of estimated channel change.

According to some aspects, as schematically illustrated in FIG. 4, in the case of more than one Kähler angle $\theta_K$ being determined, the control unit 1 is adapted to determine a total metric $M_{Ta}$, $M_{Tb}$ in a suitable manner, for example in accuracy with any one of the examples above. The control unit is then adapted to:

increase a reference signal density if the total metric $M_{Ta}$, $M_{Tb}$ indicates that the estimated channel has changed to a degree that exceeds a first threshold value T1, or to decrease a reference signal density if the total metric $M_{Ta}$, $M_{Tb}$ indicates that the estimated channel has changed to a degree that falls below a second threshold value T2, otherwise maintain the present reference signal density.

The reference signal density relates to a density for reference signals 5, 6 exchanged between at least two of the wireless communication nodes 3, 4 and can related to number of reference signals per time unit or complexity of reference signal. The reference signal density can be regarded as how many reference signals that are used in a pre-defined time slot, and can according to some aspects be defined as the number of symbols used for a reference signal in a pre-defined slot in 5G.

Figure 5:
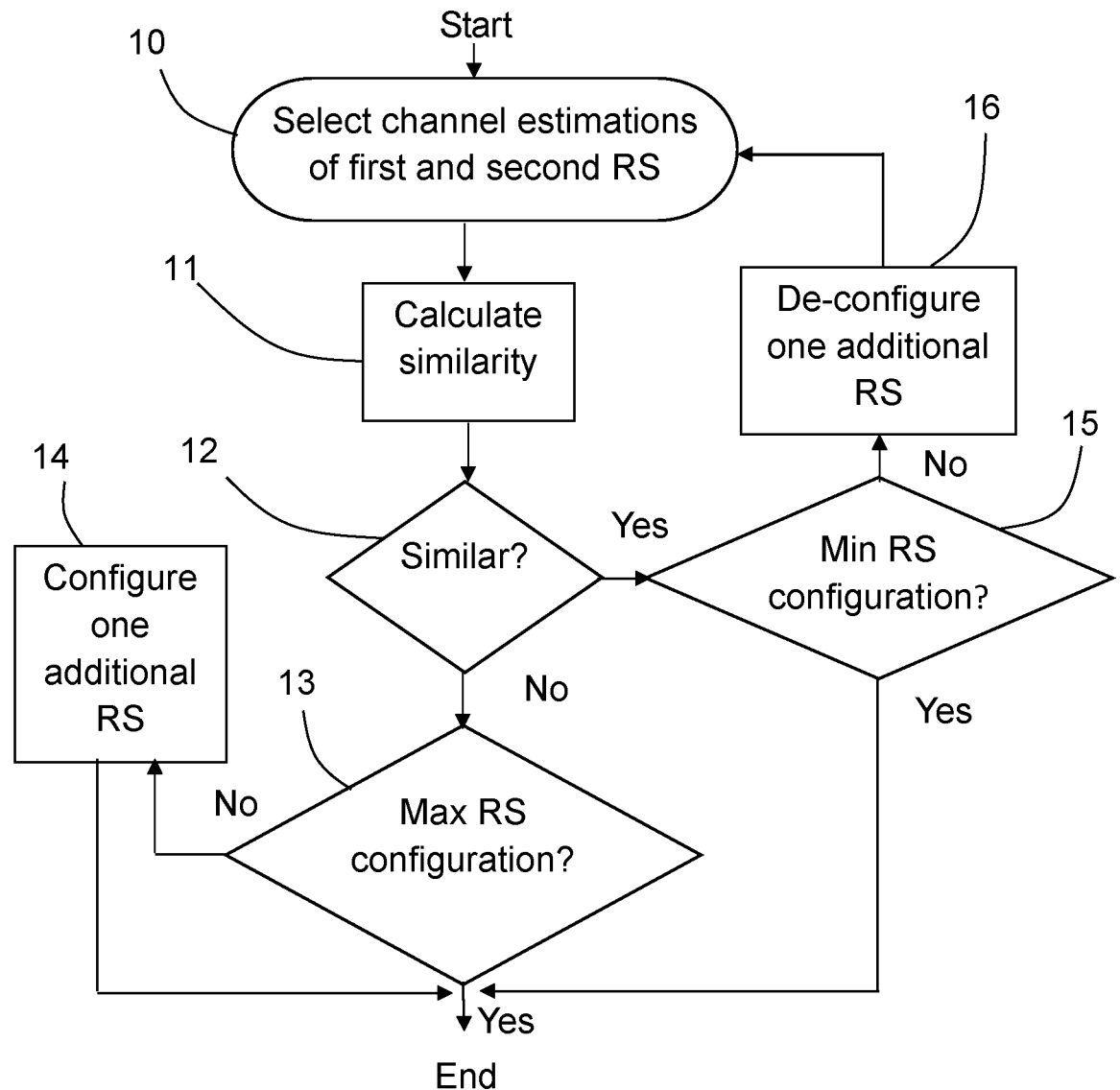
FIG. 5 shows a flowchart for a procedure according to the present disclosure.

An example of a procedure for controlling reference signal density by means of the present disclosure will now be described with reference to FIG. 5. Channel similarity measurements can be used to find an appropriate point when to reconfigure the reference signal in fast-changing channel scenarios. After a procedure Start, channel estimations $h_1$, $h_2$ from first and second reference signal are selected 10, whereby the similarity between them is calculated 11. There are now two options depending on if the channel estimations $h_1$, $h_2$ are determined 12 to be similar or not.

If they are not determined to be similar, and it is determined 13 that a present RS configuration is not a maximum RS configuration, the RS density is increased 14 in time, e.g., a 2 RS configuration is changed to a 3 RS configuration or a 3 RS configuration is changed to a 4 RSs configuration. However, additional reference signals could be configured if a current RS configuration does not consist of the maximum RS configuration. The procedure then reaches an End. If the present RS configuration is determined to be a maximum RS configuration, the procedure reaches the End.

If they are determined to be similar, and current configuration is determined 15 to be more than minimum RS configuration, it is needed to decrease 16 the RS density in time, e.g., change a 3 RS configuration to a 2 RS configuration or change a 4 RS configuration to a 3 RS configuration.

After this step, it should be checked if the new configuration density is good enough to have an accurate channel estimation or not. To this end, the algorithm should be repeated by selecting 10 new channel estimations of first and second reference signal and in the new RS configuration. By calculating 11 their similarity, and if they are not determined 12 to be similar, it means the previous configuration with a higher RS density should be reconfigured 14, otherwise the steps of determining 15 if the current configuration is more than a minimum RS configuration, and if not, the RS density is decreased 16 in time, are repeated. Should it be determined 15 that the current configuration is more than a minimum RS configuration, the procedure reaches the End.

The procedure is according to some aspects performed by means of the control unit 1. The control unit 1 is according to some aspects comprised in one of the wireless communication nodes 3, 4. The control unit 1' is according to some aspects comprised in a remote server 7 that is accessible for at least one of the wireless communication nodes 2, 3.

By means of the present disclosure:

A fast-moving UE can be configured with suitable parameters without knowing or estimating its speed.

Additional overhead can be avoided and consequently the number of available resource elements for user data allocation can be preserved.

No additional implementation is needed as an estimated channel change can be determined based on available channel estimations.

Figure 6:
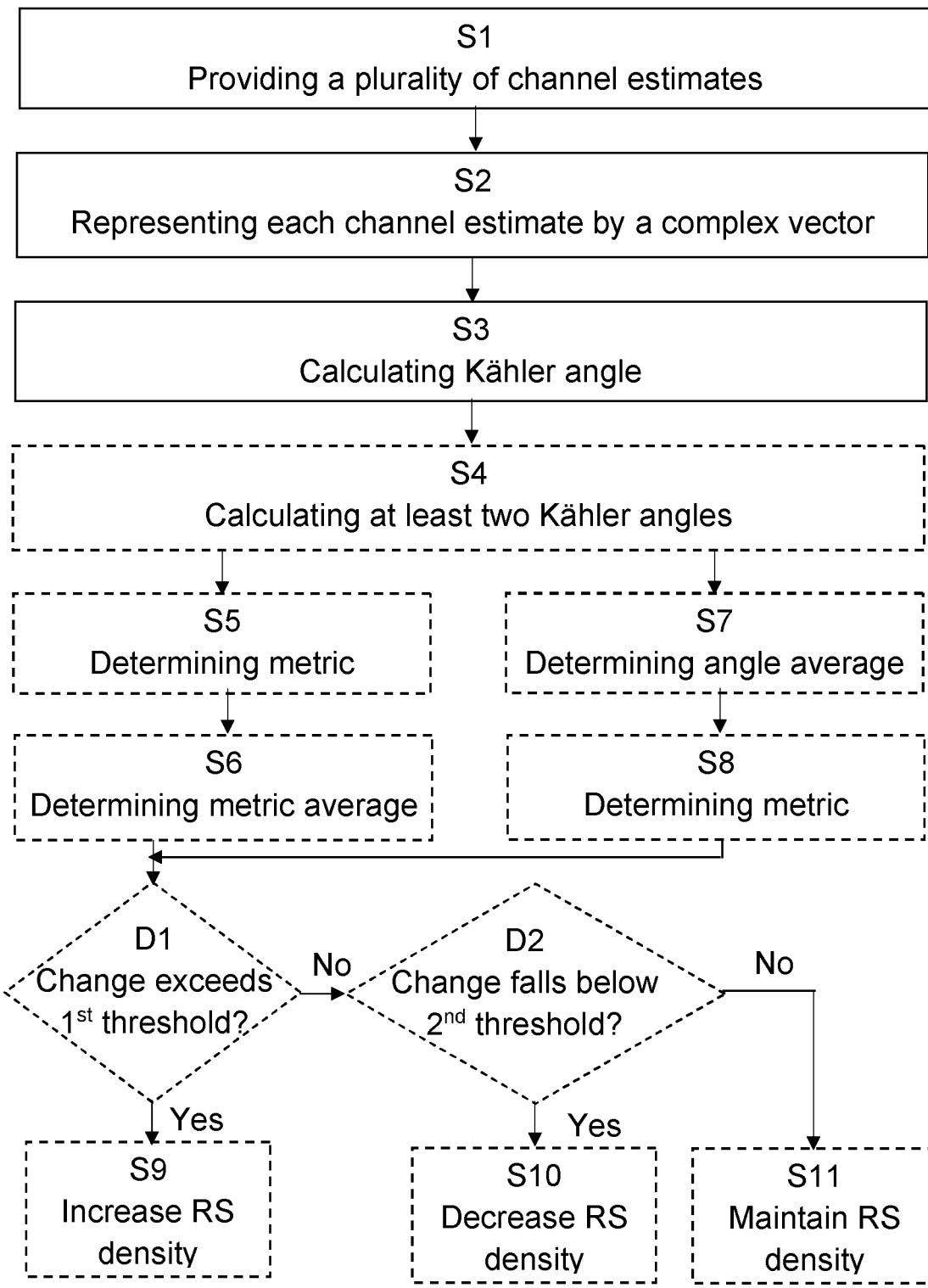
FIG. 6 shows a flowchart for methods according to the present disclosure.

With reference to FIG. 6, the present disclosure also relates to a method in a wireless communication network, where the method comprises providing S1 a plurality of channel estimates $c_1$, $c_2$, $c_3$; $c_{N-1}$, $c_N$ which are separated in time during a certain first time period $t_1$ and representing S2 each channel estimate $c_1$, $c_2$, $c_3$; $c_{N-1}$, $c_N$ by a corresponding complex channel vector in a complex vector space. Each channel estimate $c_1$, $c_2$, $c_3$; $c_{N-1}$, $c_N$ constitutes an estimated channel for a radio channel 2 provided between at least two wireless communication nodes 3, 4, where the radio channel 2 constitutes a medium via which signals transmitted between nodes 3, 4 are transferred. The method further comprises calculating S3 a difference angle between two of the complex channel vectors which are separated in time during a certain second time period $t_{2a}$, $t_{2b}$, $t_{2x}$, forming a pair of complex channel vectors, where the difference angle is a Kähler angle $\theta_K$.

According to some aspects, the plurality of channel estimates $c_1$, $c_2$, $c_3$; $c_{N-1}$, $c_N$ comprises at least three channel estimates, where the method comprises calculating S4 the Kähler angle $\theta_K$ between at least two different pairs of complex channel vectors corresponding to the at least three channel estimates such that a plurality of Kähler angles $\theta_K$ is determined and determining S5 a Kähler angle metric $\theta_{KM}$ for each Kähler angle $\theta_K$. The method further comprises determining S6 an average of the Kähler angle metrics $\theta_{KM}$ for the first time period $t_1$, where the average of the Kähler angle metrics $\theta_{KM}$ forms a total metric $M_{Ta}$ that indicates to which degree the estimated channel has changed during the first time period $t_1$.

According to some aspects, the plurality of channel estimates $c_1$, $c_2$, $c_3$; $c_{N-1}$, $c_N$ comprises at least three channel estimates, where the method comprises calculating S4 the Kähler angle $\theta_K$ between at least two different pairs of complex channel vectors corresponding to the at least three channel estimates such that a plurality of Kähler angles $\theta_K$ is determined and determining S7 an average Kähler angle $\theta_{KA}$ for the first time period $t_1$. The method further comprises determining S8 a Kähler angle metric $\theta_{KM}$ for the average Kähler angle $\delta_{KA}$, where the Kähler angle metric $\theta_{KM}$ forms a total metric $M_{Tb}$ that indicates to which degree the estimated channel has changed during the first time period $t_1$.

According to some aspects, the method comprises increasing S9 a reference signal density if D1 the total metric $M_{Ta}$, $M_{Tb}$ indicates that the estimated channel has changed to a degree that exceeds a first threshold value T1, and decreasing S10 a reference signal density if D2 the total metric $M_{Ta}$, $M_{Tb}$ indicates that the estimated channel has changed to a degree that falls below a second threshold value T2. Otherwise, the method comprises maintaining S11 the present reference signal density, where the reference signal density relates to a density for reference signals 5, 6 exchanged between at least two of the wireless communication nodes 3, 4.

According to some aspects, the Kähler angle metric is one of.

the Kähler angle $\theta_K$ itself,
sines for the Kähler angle $\theta_K$, $\sin \theta_K$, or
cosines for the Kähler angle $\theta_K$, $\cos \theta_K$.

According to some aspects, the Kähler angle metric is a monotonic function of the Kähler angle $\theta_K$.

Figure 7:
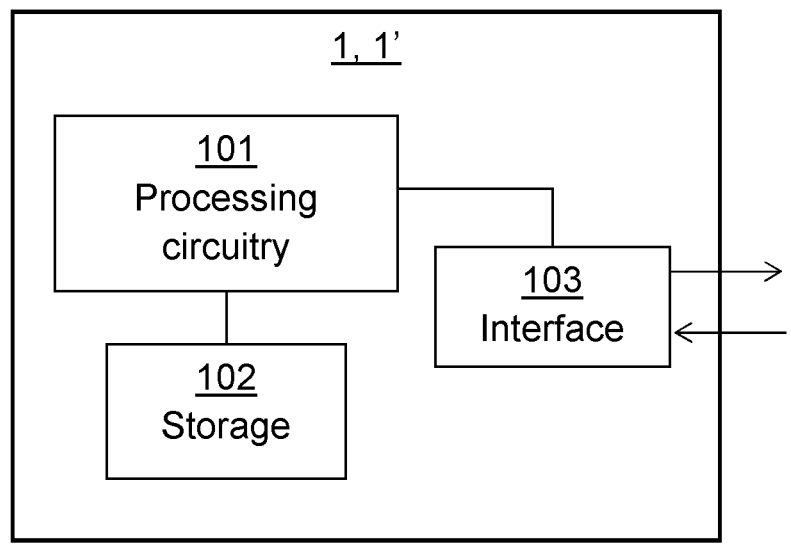
FIG. 7 schematically illustrates a control unit.

FIG. 7 schematically illustrates a control unit 1, 1' according to aspects of the present disclosure.

It is appreciated that the above described methods and techniques may be realized in hardware.

This hardware is then arranged to perform the methods, whereby the same advantages and effects are obtained as have been discussed above.

Processing circuitry 101 is provided using any combination of one or more of a suitable central processing unit (CPU), multiprocessor, microcontroller, digital signal processor (DSP), etc., capable of executing software instructions stored in a computer program product, e.g. in the form of a storage medium 102. The processing circuitry 101 may further be provided as at least one application specific integrated circuit (ASIC), or field programmable gate array (FPGA).

Particularly, the processing circuitry 101 is configured to cause the control unit 1, 1' to perform a set of operations, or steps, for example the methods described above. For example, the storage medium 102 may store the set of operations, and the processing circuitry 101 may be configured to retrieve the set of operations from the storage medium 102 to cause the control unit to perform the set of operations. The set of operations may be provided as a set of executable instructions. Thus, the processing circuitry 101 is thereby arranged to execute methods as herein disclosed.

The storage medium 102 may also comprise persistent storage, which, for example, can be any single one or combination of magnetic memory, optical memory, solid state memory or even remotely mounted memory.

The control unit 1, 1' may further comprise a communications interface 103 for communications with at least one external device. As such the communication interface 103 may comprise one or more transmitters and receivers, comprising analogue and digital components and a suitable number ports for wireline or wireless communication.

The processing circuitry 101 controls the general operation of the control unit 1, 1', e.g. by sending data and control signals to the communication interface 103 and the storage medium 102, by receiving data and reports from the communication interface 103, and by retrieving data and instructions from the storage medium 102. Other components, as well as the related functionality, of the unit are omitted in order not to obscure the concepts presented herein.

Figure 8:
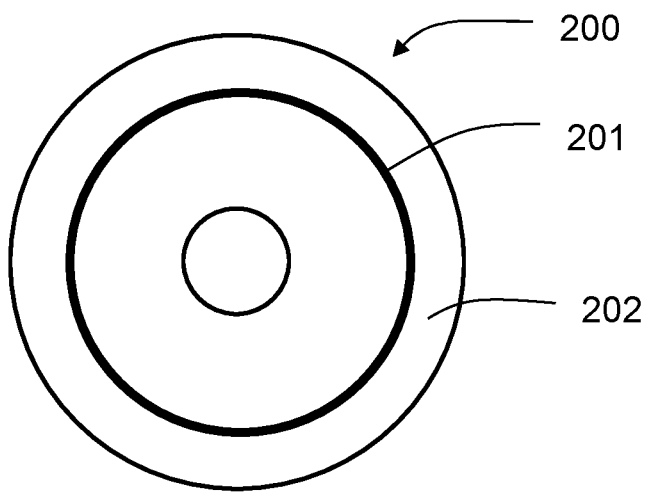
FIG. 8 schematically illustrates a computer program product.

FIG. 8 schematically illustrates a computer program product 200 comprising a computer program 201 according to the disclosure above, and a computer readable storage medium 202 on which the computer program is stored.

The present disclosure is not limited to the above, but may vary freely within the scope the appended claims. For example, according to some aspects, determining if and to which degree a radio channel changes can be used for many applications other than the described reference signal configuration. For example, the statistics of how and when a channel changes can be used for cell planning. Knowledge of how and when a channel changes can furthermore be used when selecting a specific frequency band by comparing estimated channel properties in different frequency bands.

Generally, the present disclosure relates to a control unit 1, 1' that is adapted to provide a plurality of channel estimates $c_1$, $c_2$, $c_3$; $c_{N-1}$, $c_N$ which are separated in time during a certain first time period $t_1$ and to represent each channel estimate $c_1$, $c_2$, $c_3$; $c_{N-1}$, $c_N$ by a corresponding complex channel vector in a complex vector space, where each channel estimate $c_1$, $c_2$, $c_3$; $c_{N-1}$, $c_N$ constitutes an estimated channel for a radio channel 2 provided between at least two wireless communication nodes 3, 4, where the radio channel 2 constitutes a medium via which signals transmitted between nodes 3, 4 are transferred, wherein the control unit 1, 1' further is adapted to calculate a difference angle between two of the complex channel vectors which are separated in time during a certain second time period $t_{2a}$, $t_{2b}$, $t_{2x}$, forming a pair of complex channel vectors, where the difference angle is a Kähler angle $\theta_K$.

According to some aspects, the plurality of channel estimates $c_1$, $c_2$, $c_3$; $c_{N-1}$, $c_N$ comprises at least three channel estimates, and where the control unit 1, 1' is adapted:

to calculate the Kähler angle $\theta_K$ between at least two different pairs of complex channel vectors corresponding to the at least three channel estimates such that a plurality of Kähler angles $\theta_K$ is determined,
to determine a Kähler angle metric $\theta_{KM}$ for each Kähler angle $\theta_K$, and
to determine an average of the Kähler angle metrics $\theta_{KM}$ for the first time period $t_1$, where the average of the Kähler angle metrics $\theta_{KM}$ forms a total metric $M_{Ta}$ that indicates to which degree the estimated channel has changed during the first time period $t_1$.

According to some aspects, the plurality of channel estimates $c_1$, $c_2$, $c_3$; $c_{N-1}$, $c_N$ comprises at least three channel estimates, and where the control unit 1, 1' is adapted:

to calculate the Kähler angle $\theta_K$ between at least two different pairs of complex channel vectors corresponding to the at least three channel estimates such that a plurality of Kähler angles $\theta_K$ is determined,
to determine an average Kähler angle $\theta_{KA}$ for the first time period $t_1$, and
to determine a Kähler angle metric $\theta_{KM}$ for the average Kähler angle $\theta_{KA}$, where the Kähler angle metric $\theta_{KM}$ forms a total metric $M_{Tb}$ that indicates to which degree the estimated channel has changed during the first time period $t_1$.

According to some aspects, the Kähler angle metric is one of:
the Kähler angle $\theta_K$ itself,
sines for the Kähler angle $\theta_K$, $\sin \theta_K$, or
cosines for the Kähler angle $\theta_K$, $\cos \theta_K$.

According to some aspects, the Kähler angle metric is a monotonic function of the Kähler angle $\theta_K$.

According to some aspects, the control unit 1, 1' is adapted to increase a reference signal density if the total metric $M_{Ta}$, $M_{Tb}$ indicates that the estimated channel has changed to a degree that exceeds a first threshold value T1, to decrease a reference signal density if the total metric $M_{Ta}$, $M_{Tb}$ indicates that the estimated channel has changed to a degree that falls below a second threshold value T2, otherwise to maintain the present reference signal density, where the reference signal density relates to a density for reference signals 5, 6 exchanged between at least two of the wireless communication nodes 3, 4.

According to some aspects, the control unit 1 is comprised in one of the wireless communication nodes 3.

According to some aspects, the control unit 1' is comprised in a remote server 7 that is accessible for at least one of the wireless communication nodes 3.

Generally, the present disclosure also relates to a wireless communication node 3 comprising a control unit 1 according to the above.

Generally, the present disclosure also relates to a computer program product 200 comprising computer readable medium 202 carrying a computer program 201, the computer program 201 comprising computer executable instructions, the computer executable instructions 201 being configured such that, on execution by processing circuitry 101, the processing circuitry 101 executes any one of, or a combination of, the methods according to the above.

The invention claimed is:

1. A control unit for controlling transmission of reference signals, the reference signals being transmitted with a reference signal density, the control unit being configured to:
   provide a plurality of channel estimates which are separated in time during a certain first time period;
   represent each channel estimate by a corresponding complex channel vector in a complex vector space, each channel estimate constituting an estimated channel for a radio channel provided between at least two wireless communication nodes, the radio channel constituting a medium via which signals transmitted between nodes are transferred;
   calculate a difference angle between two of the complex channel vectors which are separated in time during a certain second time period, forming a pair of complex channel vectors, the difference angle being a Kähler angle ($\theta_K$); and
   configure the reference signal density based on the calculated Kähler angle ($\theta_K$).

2. The control unit according to claim 1, wherein the plurality of channel estimates comprises at least three channel estimates, and where the control unit is configured:
   to calculate the Kähler angle ($\theta_K$) between at least two different pairs of complex channel vectors corresponding to the at least three channel estimates such that a plurality of Kähler angles ($\theta_K$) is determined;
   to determine a Kähler angle metric ($\theta_{KM}$) for each Kähler angle ($\theta_K$); and
   to determine an average of the Kähler angle metrics ($\theta_{KM}$) for the first time period, where the average of the Kahler angle metrics ($\theta_{KM}$) forms a total metric that indicates to which degree the estimated channel has changed during the first time period.

3. The control unit according to claim 2, wherein the Kähler angle metric is one of:
   the Kähler angle ($\theta_K$) itself;
   sines for the Kähler angle ($\theta_K$), $\sin \theta_K$; or
   cosines for the Kähler angle ($\theta_K$), $\cos \theta_K$.

4. The control unit according to claim 2, wherein the Kähler angle metric is a monotonic function of the Kähler angle ($\theta_K$).

5. The control unit according to claim 2, wherein the control unit is configured to increase the reference signal density if the total metric indicates that the estimated channel has changed to a degree that exceeds a first threshold value, to decrease the reference signal density if the total metric indicates that the estimated channel has changed to a degree that falls below a second threshold value, otherwise to maintain the reference signal density at a present value, where the reference signal density relates to a density for reference signals exchanged between at least two of the wireless communication nodes.

6. The control unit according to claim 1, wherein the plurality of channel estimates comprises at least three channel estimates, and where the control unit is configured:
   to calculate the Kähler angle ($\theta_K$) between at least two different pairs of complex channel vectors corresponding to the at least three channel estimates such that a plurality of Kähler angles ($\theta_K$) is determined;
   to determine an average Kähler angle ($\theta_{KA}$) for the first time period; and
   to determine a Kähler angle metric ($\theta_{KM}$) for the average Kähler angle ($\theta_{KA}$), where the Kähler angle metric ($\theta_{KM}$) forms a total metric that indicates to which degree the estimated channel has changed during the first time period.

7. The control unit according to claim 6, wherein the Kähler angle metric is one of:
   the Kähler angle ($\theta_K$) itself;
   sines for the Kähler angle ($\theta_K$), $\sin \theta_K$; or
   cosines for the Kähler angle ($\theta_K$), $\cos \theta_K$.

8. The control unit according to claim 6, wherein the Kähler angle metric is a monotonic function of the Kähler angle ($\theta_K$).

9. The control unit according to claim 6, wherein the control unit is configured to increase the reference signal density if the total metric indicates that the estimated channel has changed to a degree that exceeds a first threshold value, to decrease the reference signal density if the total metric indicates that the estimated channel has changed to a degree that falls below a second threshold value, otherwise to maintain the reference signal density at a present value, where the reference signal density relates to a density for reference signals exchanged between at least two of the wireless communication nodes.

10. The control unit according to claim 1, wherein the control unit is comprised in one of the wireless communication nodes.

11. The control unit according to claim 1, wherein the control unit is comprised in a remote server that is accessible for at least one of the wireless communication nodes.

12. The control unit according to claim 1, wherein the control unit is comprised in a wireless communication node other than the at least two wireless communication nodes.

13. A method in a wireless communication network for controlling transmission of reference signals, the reference signals being transmitted with a reference signal density, the method comprising:
   providing a plurality of channel estimates which are separated in time during a certain first time period;
   representing each channel estimate by a corresponding complex channel vector in a complex vector space, each channel estimate constituting an estimated channel for a radio channel provided between at least two wireless communication nodes, the radio channel constituting a medium via which signals transmitted between nodes are transferred;

calculating a difference angle between two of the complex channel vectors which are separated in time during a certain second time period, forming a pair of complex channel vectors, the difference angle being a Kähler angle ($\theta_K$); and configuring the reference signal density based on the calculated Kähler angle ($\theta_K$).

14. The method according to claim 13, wherein the plurality of channel estimates comprises at least three channel estimates, and where method comprises:

calculating the Kähler angle ($\theta_K$) between at least two different pairs of complex channel vectors corresponding to the at least three channel estimates such that a plurality of Kähler angles ($\theta_K$) is determined;

determining a Kähler angle metric ($\theta_{KM}$) for each Kähler angle ($\theta_K$); and determining an average of the Kähler angle metrics ($\theta_{KM}$) for the first time period, where the average of the Kahler angle metrics ($\theta_{KM}$) forms a total metric that indicates to which degree the estimated channel has changed during the first time period.

15. The method according to claim 14, wherein the Kähler angle metric is one of:

the Kähler angle ($\theta_K$) itself;

sines for the Kähler angle ($\theta_K$), $\sin \theta_K$; or cosines for the Kähler angle ($\theta_K$), $\cos \theta_K$.

16. The method according to claim 14, wherein the Kähler angle metric is a monotonic function of the Kähler angle ($\theta_K$).

17. The method according claim 14, wherein the method comprises:

increasing the reference signal density if the total metric indicates that the estimated channel has changed to a degree that exceeds a first threshold value;

decreasing the reference signal density if the total metric indicates that the estimated channel has changed to a degree that falls below a second threshold value; otherwise maintaining the reference signal density at a present value, where the reference signal density relates to a density for reference signals exchanged between at least two of the wireless communication nodes.

18. The method according to claim 13, wherein the plurality of channel estimates comprises at least three channel estimates, and where method comprises:

calculating the Kähler angle ($\theta_K$) between at least two different pairs of complex channel vectors corresponding to the at least three channel estimates such that a plurality of Kähler angles ($\theta_K$) is determined;

determining an average Kähler angle ($\theta_{KA}$) for the first time period; and determining a Kähler angle metric ($\theta_{KM}$) for the average Kähler angle ($\theta_{KA}$), where the Kahler angle metric ($\theta_{KM}$) forms a total metric that indicates to which degree the estimated channel has changed during the first time period.

19. The method according to claim 13, wherein the method comprises:

increasing the reference signal density if a total metric indicates that the estimated channel has changed to a degree that exceeds a first threshold value;

decreasing the reference signal density if the total metric indicates that the estimated channel has changed to a degree that falls below a second threshold value;

otherwise maintaining the present reference signal density at a present value, where the reference signal density relates to a density for reference signals exchanged between at least two of the wireless communication nodes.

20. A non-transitory computer readable medium storing a computer program, the computer program comprising computer executable instructions, the computer executable instructions being configured such that, upon execution by processing circuitry, the processing circuitry executes a method for controlling transmission of reference signals, the reference signals being transmitted with a reference signal density, the method comprising:

providing a plurality of channel estimates which are separated in time during a certain first time period;

representing each channel estimate by a corresponding complex channel vector in a complex vector space, where each channel estimate constituting an estimated channel for a radio channel provided between at least two wireless communication nodes, the radio channel constituting a medium via which signals transmitted between nodes are transferred;

calculating a difference angle between two of the complex channel vectors which are separated in time during a certain second time period, forming a pair of complex channel vectors, the difference angle being a Kähler angle ($\theta_K$); and configuring the reference signal density based on the calculated Kähler angle ($\theta_K$).

* * * * *